United States Patent [19]
Ueda et al.

[11] 3,932,036
[45] Jan. 13, 1976

[54] CARD PRINTER

[75] Inventors: Hiroyuki Ueda; Yukio Sawano; Shingo Ooue, all of Asaka, Japan

[73] Assignee: Fuji Photo Film Co., Ltd., Minami-ashigara, Japan

[22] Filed: Jan. 31, 1974

[21] Appl. No.: 438,517

[30] Foreign Application Priority Data
  Jan. 31, 1973  Japan.................................. 48-12590
  Feb. 19, 1973  Japan.................................. 48-19911

[52] U.S. Cl. ................................................ 355/40
[51] Int. Cl.² ........................................ G03B 27/52
[58] Field of Search ............... 354/5, 7, 12, 19, 109; 355/40

[56] References Cited
UNITED STATES PATENTS

| | | | |
|---|---|---|---|
| 2,868,069 | 1/1959 | Elmore | 354/106 |
| 2,931,027 | 3/1960 | Blefary | 354/12 |
| 2,975,282 | 3/1961 | Schaffer | 355/40 |
| 2,989,904 | 6/1961 | Braggs | 354/5 |
| 3,116,661 | 1/1964 | Holland | 354/7 |
| 3,304,847 | 2/1967 | Wilson | 354/19 |
| 3,356,005 | 12/1967 | Horne | 354/292 |
| 3,440,940 | 4/1969 | Yamamoto | 355/40 |
| 3,668,685 | 6/1972 | Horvath | 354/7 |

*Primary Examiner*—John M. Horan
*Attorney, Agent, or Firm*—Sughrue, Rothwell, Mion, Zinn & Macpeak

[57] ABSTRACT

A card dispenser comprising a sheet-like optical information recording member bearing a number of indicia for a card recorded thereon, positioning means for moving the recording member in the plane thereof, an optical system for projecting the indicia recorded on the recording member onto a photographic photosensitive paper, means for feeding the photographic photosensitive paper through a focussing position of the optical means, means for processing the photosensitive paper, means for controlling the feeding means to selectively position the recording member at the optical focussing position of the optical system, and an input means for providing a signal to the controlling means for positioning the recording member at a selected indicia. Embodiments include additionally a display means for converting an electric image signal into a pattern, an optical system for also projecting the indicia indicated on the display means onto the photosensitive paper, and means for generating an electric image signal input into the display means.

6 Claims, 5 Drawing Figures

CARD PRINTER

BACKGROUND OF THE INVENTION

1. Field of the Invention

This invention relates to an automatic card dispenser for dispensing various kinds of cards, tickets and the like, such as lunch tickets, toll road tickets, ID-cards, etc. This invention is applicable to a card dispenser which dispenses cards containing different entries depending on the input signal, and particularly suitable for automatic dispensing of monthly, quarterly, etc. railway and subway passes, tickets or commutation cards.

The description appearing herein after is with reference to a particular embodiment of a monthly pass dispenser.

2. Description of the Prior Art

In general, in issuing monthly railway passes, the name of the starting station and the terminal station, the period of validity, and the issue date are stamped on a card. This work takes a long time and considerable labor is required to check the work to prevent mistakes. It is, therefore, strongly desired to do this work automatically to reduce the work required in issuing such cards.

As a conventional ticket dispenser, an automatic ticket dispenser is known in the art in which a disc bearing a number of indicia of the names of stations, periods of validity and other letters and numerals is rotated to select indicia according to the input information and indicia is recorded on an electrostatic recording paper using light and an electrostatic recording means. Such a device has a defect that the indicia 104 must be recorded only in the annular part 102 of the disc 101 as shown in FIG. 1. This is because the radial length of the part where the indicia are recorded is determined by the size 103 corresponding to the actual size of the ticket. In tickets such as railroad tickets, it is only required to indicate the start station and the price, and accordingly, the number of indicia to be recorded is not so large. In case of a monthly pass, however, the items to be recorded are quite large in number, e.g. 1,000. If the disc is used for retaining the great number of indicia, the diameter of the disc inevitably is large and accordingly the size of the dispenser becomes too large. It is also proposed to use a rolled microfilm to increase the number of the indicia recorded. In addition, to reduce the work load and labor involved in issuing a large number of kinds of tickets with indicia storage means of a small size, one additional problem to be solved other than space is how to dispense the tickets and a further important problem is how to shorten the time for dispensing each ticket.

A reduction in the number of indicia is one approach and the shortening of the dispensing time is another. For instance, in case of dispensing monthly tickets, the number of numerals to be entered into the form of the ticket is 20 to 30. If these numerals are recorded in advance as different indicia on a recording member, the selection and exposure of the indicia can be made at once but the number of indicia recorded in advance is quite large. If the number of numerals is 20, the theoretically possible combinations of the numerals is as large as $10^{20}$.

If the numeral indicia are recorded in a divided form so as to be composed at the time of exposure, for instance, to be composed using twenty exposures, the number of numeral indicia can be reduced to $10 \times 20 = 200$, but the time for selection and exposure is increased by a factor of 20 times the time for exposure where all the numerals are recorded for the different indicia in advance.

SUMMARY OF THE INVENTION

This invention provides a high speed and large capacity indicia recording device of small size in which the indicia are recorded on a sheet-like recording member and the recording sheet is moved in the two-dimensional directions to select indicia, whereby it becomes possible to issue a number of kinds of monthly tickets automatically as well as the normal railroad tickets.

The present invention also provides a card dispenser in which the problems inherent in the conventional dispenser are solved by indicating on a display device a part of the indicia to be recorded on the card and composing the indicia displayed and a indicia recorded in a microfilm on a sheet-like recording member on a photosensitive material.

BRIEF DESCRIPTION OF THE ACCOMPANYING DRAWINGS

DESCRIPTION OF PREFERRED EMBODIMENTS

Now the construction of the present invention will be described with reference to the embodiment shown in FIG. 2.

Figure 3:
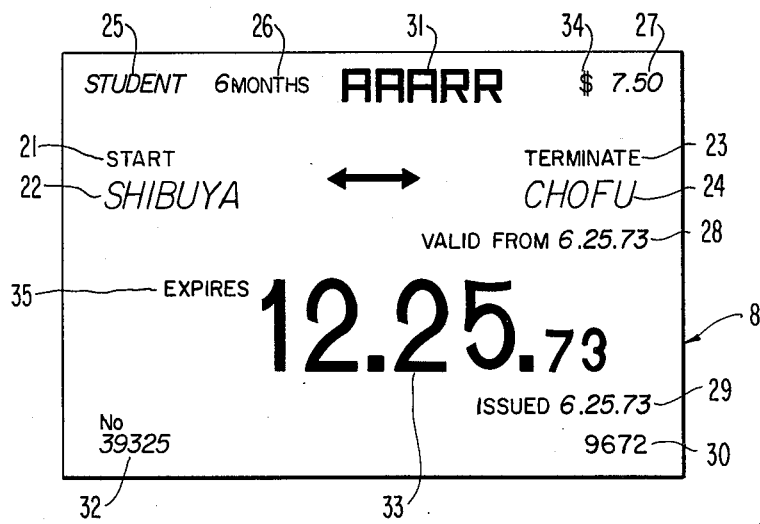
FIG. 3 is a plan view showing an example of a monthly ticket made by the dispenser of this invention.

The buyer of a monthly ticket enters the name of the stations and the period of validity on an application form and submits the application to the ticket window. The clerk at the window inputs a signal using a keyboard 1 according to the entries on the application form. Instead of the keyboard 1 a mark card 20 and a card reader for generating the input can alternatively be used. The input signal is stored in the memory means in a control part 2 and then supplies coordinate signals for selection of the indicia to a device 4 for moving the optical information recording member 3 successively according to the start signals coming from the keyboard 1. On the other hand, a part of the numeral indicia indicating the ticket number, the date and so forth is indicated on a display device 5 by a signal from the control part. On the optical information bearing member shown in FIG. 3 are recorded a number of indicia (letters, numerals, marks etc.) for monthly tickets using a microfilm technique.

When a first indicia (e.g. the name of the start station) is brought under a projection lens 6, a shutter 7 is opened and the indicia is printed on a photographic paper 8 by an optical projection system. After the shutter 7 is closed, a second indicia (e.g. the name of the terminal station) is printed on the same photographic paper 8 when the second indicia is brought under the projection lens 6 by a transfer device 4. By repeating such operations, exposure is repeated on the same photographic paper 8. At the same time, the indicia of the numerals and letters indicated on the display device 5 is printed on the paper 8 through a half-transparent mirror 11 by projection lenses 9 and 10.

Although the composite optical system which has been described hereinabove uses a half-mirror, it will be understood that a composite optical system using a total reflecting mirror outside the visual field of the microfilm projection system for composing an image by projecting indicia displayed on the display device from the skew direction on the photographic paper can be employed. However, from the standpoint of quality of the image, it is preferred to use the method employing a half-transparent mirror.

Figure 2:
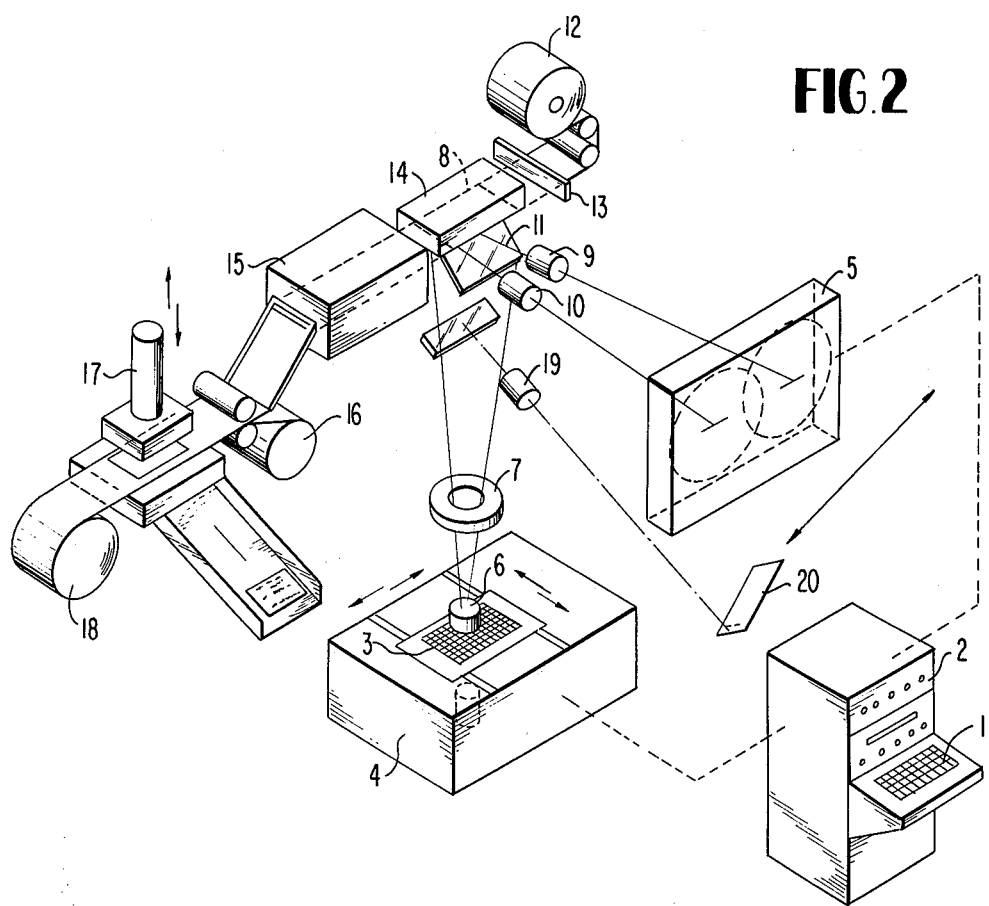
FIG. 2 is a schematic perspective view showing the construction of the present invention.

Although two lenses are used as the projection lens system in FIG. 2, only one lens is needed if the lens is of a wide angle type.

Therefore, just by indicating twenty letters on the display device 5 a great number of indicia from 200 to $10^{20}$ are not needed to be recorded on the optical information recording member 3 and all the numerals required for making a monthly ticket can be recorded on a photographic paper with only one exposure. Further, by using a composite optical system, the projection of the indicia as of Chinese Characters from a microfilm can be made simultaneously with the display and the time for issuing the monthly ticket can be markedly shortened.

Further, in this invention, the display device 5 means a device which converts an electric image signal to a pattern of numerals and letters and indicates the indicia.

The photographic paper 8 after exposure is fed out of the roll 12 and cut by a cutter 13 and held in the position for exposure printing by a feed holding device 14. The paper 8 is fed out to a processing station 15 by the feed holding device 14 after the exposure. At the processing station 15, the photographic paper 8 is subjected to the process of development and fixation or the process of development and stabilization, and a visual image appears on the photographic paper which has passed through the processing station 15. This photographic paper can be used as a ticket such as a monthly ticket. This paper can be more conveniently used if it is laminated with a laminate film fed out of the laminate film roll 16 and cut by a formed cutter 17. The laminate film is printed with a certain print in advance. By the lamination, therefore, water resistance is enhanced and forgery of the tickets becomes difficult. Although an ordinary cutter may be used instead of the formed cutter 17, the formed cutter 17 is preferred from the standpoint of disposal of scrap paper since the scrap paper can simply be wound up in a scrap roll 18 and easily disposed when the formed cutter 17 is used. It is possible to project the name of the person entered on the mark card 20 together with the indicia on the roll paper by use of a mark card projection lens 19.

Now a detailed description is given with reference to FIG. 3 with respect to what part of the indicia is indicated by the display device 5 and the optical information recording member 3 when the card is issued.

The indicia of the start station 21 and 22, the indicia of the terminal station 23 and 24, and the indicia of the kind of the monthly ticket 25 are all combinations of letters, symbols, characters, etc., and accordingly, they are desired to be recorded on the optical information recording member. On the other hand, the numeral indicia 26 indicating the number of months of validity, the numeral indicia 27 indicating the price, the numeral indicia 28 indicating the start of the term of validity, the numeral indicia 29 indicating the issue date and the numeral indicia 32 indicating the ticket number are simple combinations of numerals, and accordingly easily indicated by use of the display device 5.

As the display device for indicating the indicia, it is possible to use a numeral indicating tube as used in an electric calculator, which can be manufactured at a very low cost.

Further, it is possible to use a slide projector for printing fixed information such as the title of the card dispenser 30, the name of the railroad company 31, letters common to the tickets (e.g. the price of the ticket 34, "till" for the term of validity 35) by selectively energizing a light source by the control part 2 and exposing the photographic paper 8 therewith through the indicia projecting lenses 9 and 10.

Figure 4:
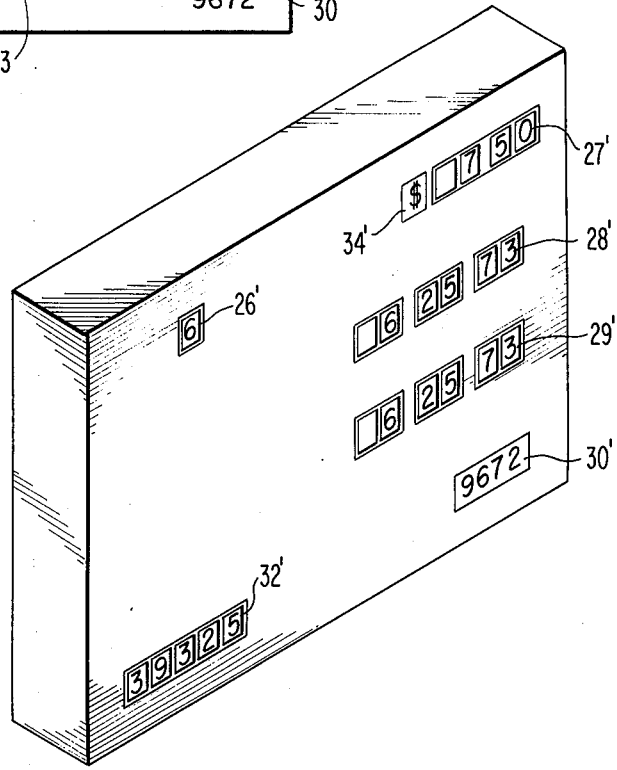
FIG. 4 is a perspective view of a display device used in the present invention.

In FIG. 4 is shown an embodiment of the arrangement of indicia as numerals and letters in the display device using numeral indicating tubes. The reference numerals 26' indicates a numeral indicating tube for indication of the number of months of validity, 27' for the price, 28' for the beginning date of term, 29' for the issue date, and 32' for the card number. The numeral 30' indicates the title of the dispenser, and 34' indicates the unit of price. These two are concerned with the fixed information, and accordingly, are printed in a slide and illuminated from the backside with diffused light. Here, the reference numerals 26', 27', 28', 29', 32', 30' and 34' shown in FIG. 4 all correspond to the reference numerals 26, 27, 28, 29, 32, 30 and 34 shown in FIG. 3, respectively.

As the display device, a CRT display device using a cathode ray tube can be used. In case of the CRT display device, there are advantages that, in spite of the high cost thereof, indicia such as the alphabet and other special letters can be indicated as well as numerals and the indication position of the numerals and letters can be easily changed and the image signal from the television camera can be used for indication of the image by means of an electric composition.

Figure 1:
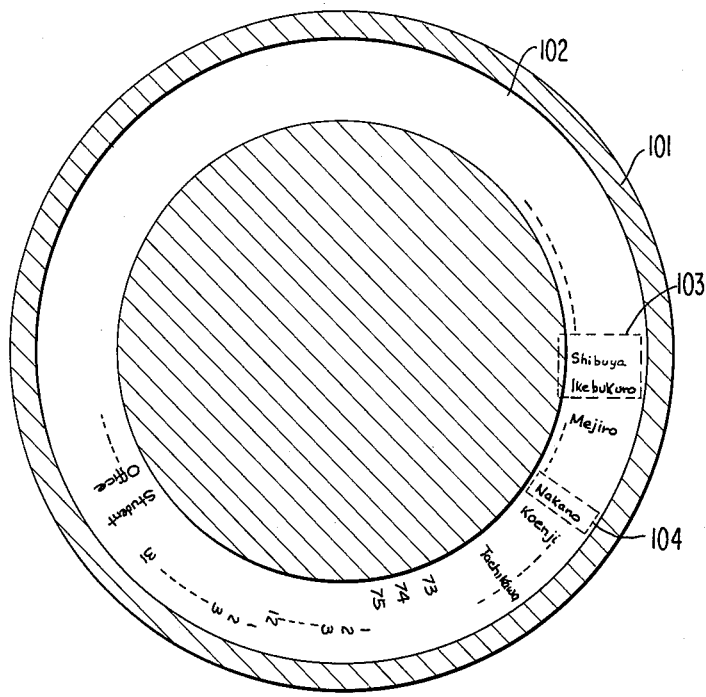
FIG. 1 is a plan view showing an example of an optical information recording member used in the conventional railroad ticket dispenser.

The indication of the image signal from the television camera is advantageous from the standpoint of convenience in the following respect. In case of recording the name of the person who uses the season ticket where, as mentioned before, the mark card 20 positioned at the predetermined position in FIG. 1 is projected on the photographic paper 8 by use of a mark card lens 19 for exposure, the relation of black-and-white is reversed unless a reversal process is performed if the name of the person is entered in the mark card with a pen or pencil. However, if the name is recorded using a television camera and indicated on a cathode ray tube with the black-and-white reversed, it becomes possible to record the name with black lines on a white background. Further, in using the card dispenser in accordance with the present invention as a dispenser in ID cards, the face of the person is recorded by the television camera and is displayed on the display device with the black-and-white relation reversed electrically together with information for the ID card to make an ID-card with the picture of the person immediately. Since the photographic paper used for issuing cards records the indicia such as letters and numerals clearly, the gradation thereof is usually of high contrast (of high gamma value). With such a photographic paper, the record of the face of a person with a soft tone is difficult and the high light portion and the shadow portion are not faithfully reproduced. By use of the television camera, it becomes possible to record the face of the person and electrically indicate the image of the face with low contrast on the display device and thereby record the image on the card with the favorable gradation together with sharp letters and numerals.

Although it would be proposed to indicate all the information of the card on the display device and use no optical information recording medium like a microfilm, such a method is disadvantageous in the following respects.

That is, in order to indicate clearly complex indicia, such as Chinese Characters, for indication of the start station and terminal station, a CRT display device of considerably high resolving power is necessitated. The raster must have at least 3000 lines/frame of resolving power, which requires a very costly display device. In addition, the device for forming the Chinese letters is costly and the control device therefor is complicated. Therefore, it can be understood that the device in accordance with the present invention in which the favorable features of the microfilm and those of the display device are combined is the most advantageous.

The explanation given hereinbelow demonstrates how much smaller the sheet-like optical information recording member (3 in FIGS. 2 and 5) which is movable in a two-dimensional direction can be in comparison with the prior art disc approach.

If the lateral width of the indicia to be recorded (104 in FIG. 1, 301 in FIG. 3) is $10a$ and the longitudinal length thereof is $a$, the peripheral length of the disc of the diameter r is $2\pi r$. Accordingly, the number $N_D$ of indicia which can be recorded cannot be made larger than $2\pi r/a$. In this case, the lateral width has no direct relation with $N_D$. Although $N_D$ can be reduced further according to a more detailed calculation, it has a maximum upper limit of $2\pi r/a$. The size of the sheet which can retain the same number of indicia as the $2\pi r/a$ is calculated as follows. Assuming that $a$ is 1/500 of $r$, then $N_D$ becomes substantially $6.28 \times 500 = 3140$. The area of the sheet in this case becomes $10a^2 \times 3140 = 31400a^2$. If the sheet is a square, the length of one side is 177 a.

On the other hand, if the diameter of the disc becomes $2r = 2 \times 500a = 1000a$, which requires a disc of a diameter five times or more larger than the length of one side of the sheet. When an further even larger number of indicia (e.g. four times) are required, the longitudinal length $a$ must be 1/2000 of the radius $r$ in case of the disc. In this case, in contrast to a disc of a diameter $4000a$, the length of the side of a sheet of square shape is only $354a$ since the area of the sheet should be $6.28 \times 2000 \times 10a^2$. Therefore, the same number of indicia as those recorded on a disc of a specific diameter can be recorded on a sheet of a length of not larger than a tenth of the diameter. The above is true in the case of recording indicia having a length to width ratio of 10:1, and the difference in size between the two will become even larger in case of recording indicia having a square shape. In case of a disc, the central part thereof is usually blank and accordingly the number of indicia which can be recorded increases in proportion to the diameter. However, in case of the sheet-like recording member the number of indicia recorded increases in proportion to the square of the length of one side thereof. Accordingly, the use of the sheet-like recording member is markedly advantageous in constructing a small size recording device.

A comparison of the sheet recording member with a rolled recording member instead of the disc will be made hereinafter.

In case of a disc, the number of the indicia recorded does not increase as greatly as the increase in the diameter since the central part of the disc is always blank. In order to improve this disadvantage, a rolled film can be used. However, in a rolled film, the time for moving the film for selection of indicia increases in proportion to the increase in the number of indicia if the film is fed at a constant speed. Further, a plurality of lenses can be used with a plurality of rolled films arranged in parallel. This method, however, is impractical because 40 lenses are required to shorten the time by a fortieth.

On the other hand, in the sheet-like indicia recording member used in this invention, the increase in the film feed time is in proportion to the square root of the number of indicia. This is because the sheet is moved along two coordinate axes. For instance, if 1600 indicia are selected, the time of film feed required in a square sheet film is 1/40 of the time required in a rolled film if the film feed speed is the same in the rolled film feed and the sheet film feed.

As described in detail, the use of the sheet-like information recording member is quite advantageous from the standpoint of the space occupied and the processing speed in comparison with the use of the disc and the rolled film approaches.

Figure 5:
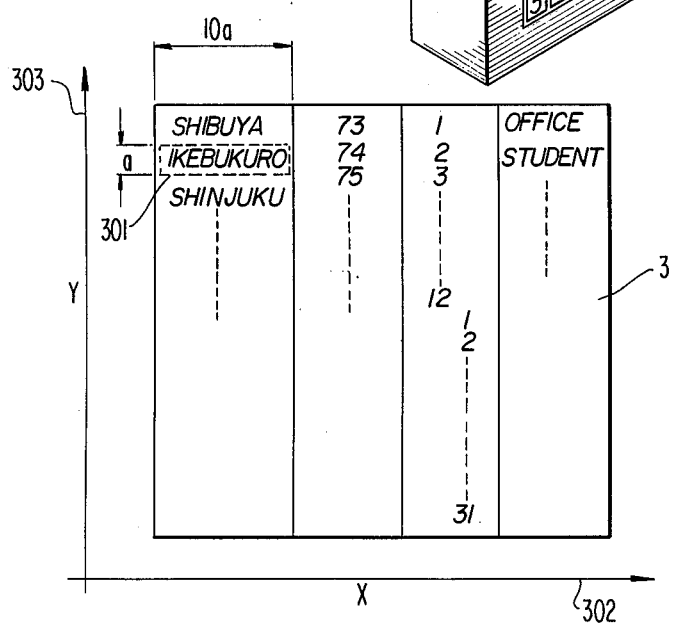
FIG. 5 is a plan view showing an example of the optical information recording member used in the device in accordance with the present invention.

As the device for moving the sheet-like optical information recording member (indicia recording member) in a two dimensional direction along the rectangular axes 302 and 303 in FIG. 5, various devices can be used such as a device using a position detecting circuit and a servomotor with its driving circuit, and a device using a pulse motor. The most practical device is of a type which uses a potentiometer as the position detecting circuit and drives the servomotor with a difference between the coordinate signal and the detected position signal. This type is preferred from the standpoint of speed selection as well.

Although the movement of the indicia recording member has been considered along the rectangular axes, it will be understood that the film can be moved along a skew axis included in the plane of the face of the indicia recording member.

Although the present invention has been described with particular reference to a railroad ticket like a monthly ticket, it will readily be understood that the invention can be applied to a card dispenser for lunch tickets, an ID card dispenser, a credit card dispenser, etc.

While the invention has been described in detail and with reference to specific embodiments thereof, it will be apparent to one skilled in the art that various changes and modifications can be made therein without departing from the spirit and scope thereof.

What is claimed is:

1. A card dispenser comprising: a sheet-like optical information recording member bearing a number of ordered indicia recorded thereon, positioning means for moving said recording member in the coordinate axes of the plane thereof, a first optical system for projecting portions of the ordered indicia recorded on said recording member onto a photographic photosensitive paper at descrete locations thereon, a second optical system for projecting a signature, or other random identifying indicia onto said photographic photosensitive paper at a location separate from said descrete locations, means for feeding the photographic photosensitive paper through the focusing position of said first and second optical means, means for the development processing of said photosensitive paper, means for controlling said positioning means to selectively position said recording member relative to said first optical system for projection at the optical focusing position of said first optical system, and input means for providing a signal to said controlling means for positioning the recording member in a selected pattern to define the locations for said ordered indicia and said random indicia to be recorded on said photographic photosensitive paper.

2. The card dispenser of claim 1, including a display means for converting an electric image signal into a display pattern, an optical system for projecting the display pattern indicated on the display means onto said photosensitive paper, and means for generating an electric image signal input into said display means.

3. The card dispenser of claim 2, wherein said display device comprises an array of numeral indicating tubes.

4. The card dispenser of claim 2, wherein said display device comprises a cathode ray tube display device.

5. The card dispenser of claim 1, including means for feeding a laminating film into superpositioning over and under said development processed paper for lamination of said paper there-between and means for cutting said laminated paper sheet into a card.

6. The card dispenser of claim 1, wherein a signature or other random identifying indicia is contained on a marked card, and said second optical system includes a projection lens, projecting said signature on random indicia on to said photosensitive paper.

* * * * *